Jan. 17, 1956   C. W. GADD   2,730,895
DISPLACEMENT PICK-UP DEVICE
Filed May 22, 1953
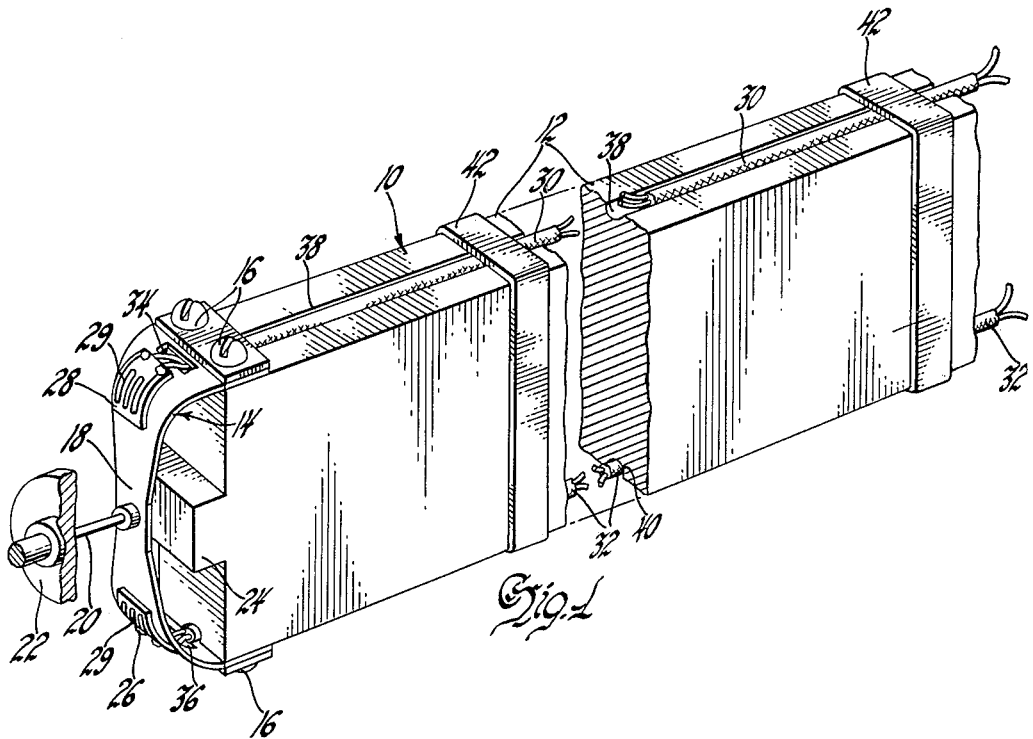
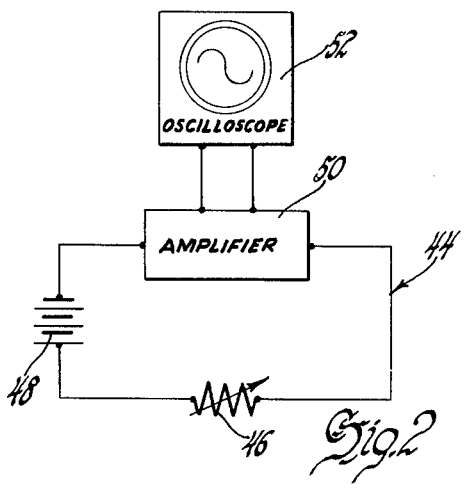
INVENTOR
Charles W. Gadd
BY
ATTORNEY United States Patent Office 2,730,895
Patented Jan. 17, 1956

2,730,895

DISPLACEMENT PICK-UP DEVICE

Charles W. Gadd, Orchard Lake, Mich., assignor to General Motors Corporation, Detroit, Mich., a corporation of Delaware Application May 22, 1953, Serial No. 356,828

7 Claims. (Cl. 73—70)

This invention relates to a pick-up device and particularly to a device for indicating the transverse displacement of a structural surface subjected to vibrational forces.

The extent of the deflections to which a structural surface is subjected by rapid transient distortions is important in determining resultant stresses, strains, and sound radiating tendencies, as for example in engines and other similar equipment where smoothness, durability and noiselessness are of major concern. Devices previously used to indicate such deflections are generally unsatisfactory because of either the inaccuracy obtained in measuring high frequency deflections, the necessity of temperature compensations, or the excessive bulk of the device which makes it difficult to handle and which tends to damp-out or lessen the resultant deflections.

It is now proposed to provide a displacement pick-up device for indicating the magnitude of the deflections of a vibrating surface which is capable of measuring high frequency vibrational displacements without being adversely affected by spurious resonances or high temperatures and which is sufficiently compact and lightweight in design to assure greater ease of handling.

In the drawings:

Figure 1 is a perspective view of a displacement pick-up device embodying the principles of this invention and partially broken away to more clearly show certain structural features thereof.

Figure 2 is a wiring diagram of a conventional strain gage circuit employable with the displacement pick-up device.

The displacement pick-up device 10 comprises a support 12 of any suitable size, shape, or dimension and preferably such that is capable of being held in the hand of an operator. A thin plate 14 of spring metal or other suitable material is arcuately bent about one end of the support 12 and is held in spaced relation thereto by screws or other suitable fastening means 16 securing the outer ends of the plate to opposite sides of the support. The plate 14 is tapered inwardly near the center thereof and is formed to provide a flexible reed 18 of known frequency response. A probe 20 is secured to the center of the reed 18 and extends outwardly for engagement with a vibrating surface to be placed under test. A part having such a surface is shown at 22. The support 12 is formed to provide a stop member 24 positioned behind and in spaced relation to the reed 18 for limiting excessive transverse movement of the probe 20 and thereby preventing detrimental distortion of the reed.

Strain gages 26 and 28 of temperature corrected fine resistance wire 29 are secured to the reed 18 and are symmetrically located on opposite sides of the probe 20. Electrical leads 30 and 32 are connected to the strain gages 26 and 28 respectively and extend through apertures 34 and 36 formed in the reed 18 and within grooves 38 and 40 formed along opposite sides of the support 12. The leads 30 and 32 are held in the grooves 38 and 40 by straps 42 extending about the support 12 and are adapted to be connected to a conventional strain gage circuit 44 such as shown in Fig. 2. The variable resistor 46, of Fig. 2, represents the strain gages 26 and 28 connected in series with a source of electrical potential 48 and an amplifier 50. An oscilloscope or other suitable indicating means 52 is connected to the amplifier 50 and is adapted to indicate the magnitude of the probe displacement as a function of the varied resistance of the strain gages 26 and 28.

In practical operation the displacement pick-up device 12 is held in the hand of an operator and the probe 20 is placed in contact with a vibrating surface. The resilience of the reed 18 causes the probe 20 to follow the movement of the vibrating surface and thereby produce synchronous vibrational movement of the reed 18. The reed 18 is tapered inwardly near the probe 20 to concentrate local reed vibrations and to eliminate other spurious resonances. The strain gages 26 and 28 are aligned for the reception of longitudinal distortions of the reed 18 caused by transverse reed deflection and are positioned on opposite sides of the probe 20 to cancel out lateral reed motion. As the reed 18 is flexed the gages 26 and 28 are subjected to stresses and strains which vary their resistance value and thereby produce a readable indication of the magnitude of probe deflection on the oscilloscope 52.

I claim:

1. A displacement pick-up device comprising a support, a reed having its ends secured to said support and its intermediate portion disposed in spaced relation thereto, a probe secured to said reed and being adapted to engage a vibrating surface, strain gages secured to said reed, and indicator means connected to said gages for indicating the deflection of said reed.

2. A displacement pick-up device comprising a support, a reed having its ends secured to said support and its intermediate portion disposed in spaced relation thereto, a probe centrally secured to said reed and being adapted to engage a vibrating surface, strain gages secured to said reed on opposite sides of said probe, and indicator means connected to said gages for indicating the deflection of said reed.

3. A displacement pick-up device comprising a support having a flexible reed arcuately bent in spaced relation about one end of said support with the ends of said reed secured thereto, a probe centrally secured to said reed and extending outwardly therefrom for engaging a vibrating surface, strain gages secured to said reed on opposite sides of said probe, and means connected to said gages for indicating the deflection of said probe as a function of the distortion of said reed.

4. A displacement pick-up device comprising a support having a flexible reed arcuately bent about and secured in spaced relation to one end thereof, the ends of said reed being secured to said support, a probe centrally secured to said reed and extending outwardly therefrom for engagement with a vibrating surface, said reed being symmetrically tapered inwardly near the center thereof and having strain gages secured thereto on opposite sides of said probe, and means connected to said gages for indicating the deflection of said probe as a function of the distortion of said reed.

5. A displacement pick-up device comprising a support having a reed secured in spaced relation to one end thereof, said reed being tapered inwardly near the center thereof and having ends arcuately bent and secured to opposite sides of said support, a probe centrally secured to said reed and being adapted to engage a vibrating surface, strain gages secured to said reed near the ends thereof and arranged symmetrically on opposite sides of said probe, and means connected to said gages for indicating the deflection of said probe as a function of the distortion of said reed.

6. A displacement pick-up device comprising a support having a reed secured in spaced relation to one end thereof, said reed being tapered inwardly near the center thereof and having ends arcuately bent and secured to opposite sides of said support, a probe centrally secured to said reed and being adapted to engage a vibrating surface, strain gages secured to said reed on opposite sides of said probe and symmetrically arranged with respect thereto, and means connected to said gages for indicating the deflection of said probe as a function of the distortion of said reed.

7. A displacement pick-up device comprising a support having a flexible plate secured in spaced relation to one end thereof, said plate being tapered inwardly near the center thereof and having ends arcuately bent and secured to opposite sides of said support to form a vibrational reed, a probe centrally secured to said reed and being adapted to engage a vibrating surface, a stop member formed on said support behind and in spaced relation to said reed for limiting axial movement of said probe, strain gages secured to said reed and symmetrically arranged on opposite sides of said probe, and means connected to said gages for indicating the deflection of said probe as a function of the distortion of said reed.

References Cited in the file of this patent

UNITED STATES PATENTS

| | | |
|---|---|---|
| 2,002,372 | Greentree et al. | May 21, 1935 |
| 2,359,245 | Ritzmann | Sept. 26, 1944 |

FOREIGN PATENTS

| | | |
|---|---|---|
| 628,400 | Great Britain | Aug. 29, 1949 |

OTHER REFERENCES

Journal of Scientific Instruments, vol. 27, August 1950, pp. 212–214, Boggis et al.